2 Sheets--Sheet 1.

J. H. WHITNEY.
Grain-Binders.

No. 151,459.　　　　　　　　Patented May 26, 1874.

Witnesses　　　　　　　　　　　　　　Inventor:

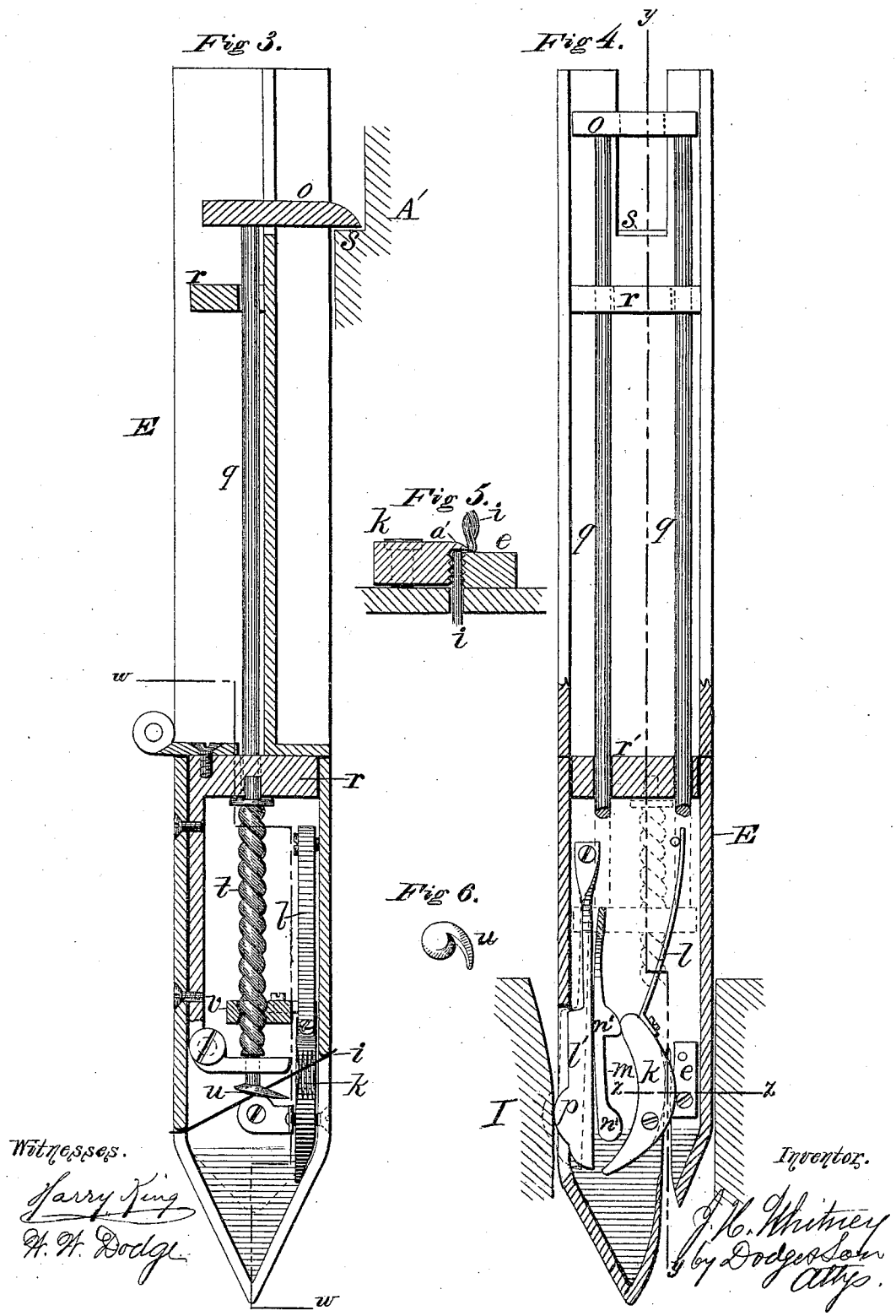

UNITED STATES PATENT OFFICE.

JOHN H. WHITNEY, OF ROCHESTER, MINNESOTA, ASSIGNOR OF ONE-HALF HIS RIGHT TO AUGUSTUS SUMNER, OF ST. LOUIS, MISSOURI.

IMPROVEMENT IN GRAIN-BINDERS.

Specification forming part of Letters Patent No. 151,459, dated May 26, 1874; application filed March 28, 1874.

*To all whom it may concern:*

Be it known that I, JOHN H. WHITNEY, of Rochester, in the county of Olmsted and State of Minnesota, have invented certain Improvements in Grain-Binders, of which the following is a specification:

My invention relates to binders for grain-harvesters; and the invention consists in a novel construction of the mechanism that performs the binding, as hereinafter described.

Figure 1:
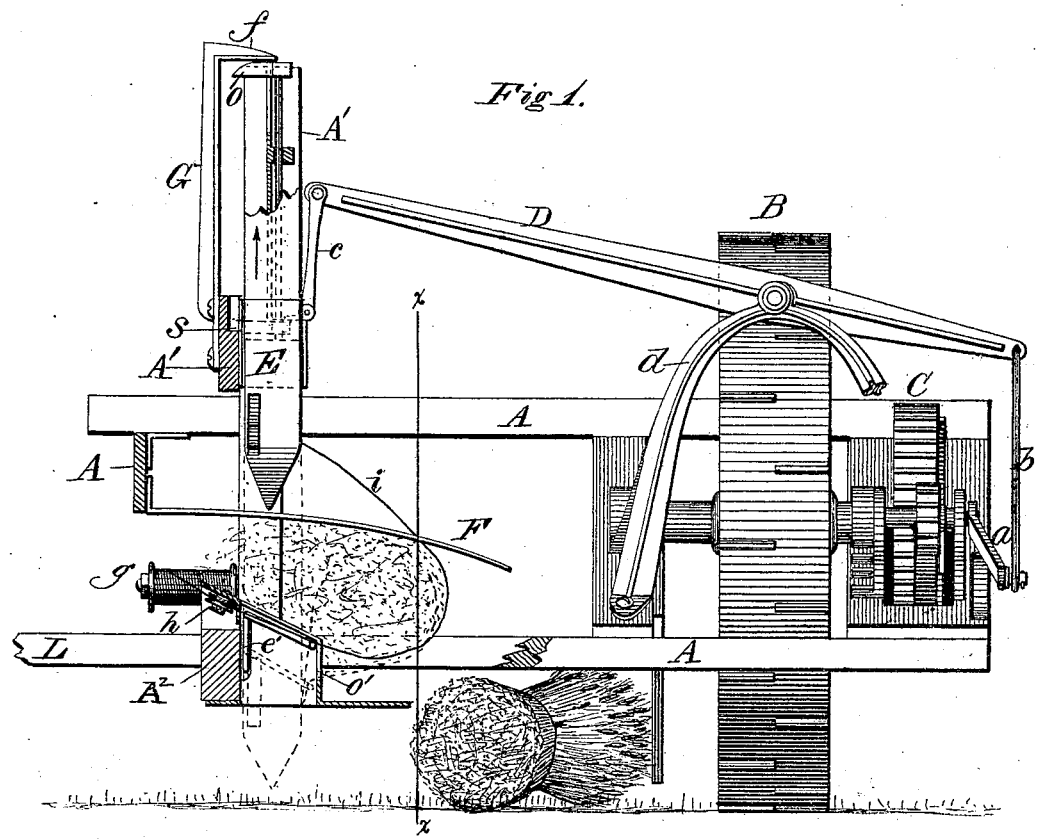
Figure 2:
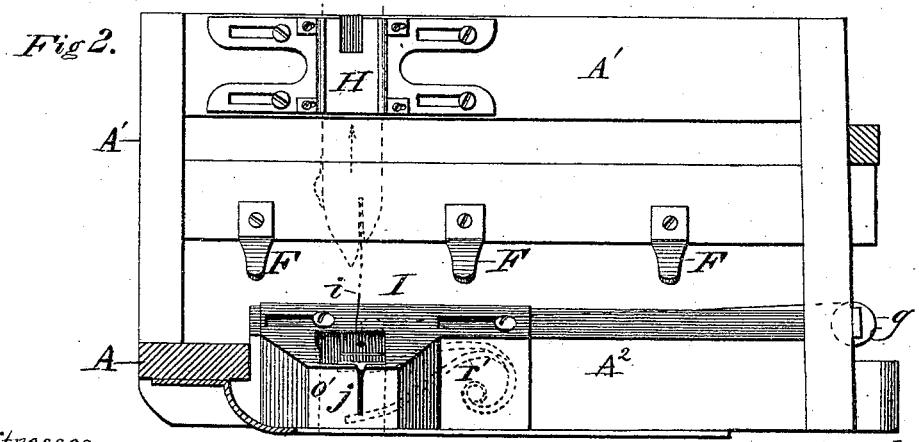

Figure 1 is a front elevation of a harvester having my binder attached, the platform being omitted, and a portion being broken away to show the binder more clearly. Fig. 2 is a side elevation of the frame which supports the binder, taken on the line $x\ x$ of Fig. 1. Fig. 3 is a vertical section of the binder or needle on the line $y\ y$ of Fig. 4. Fig. 4 is sectional view of the same on the line $w\ w$ of Fig. 3. Fig. 5 is a horizontal section on the line $z\ z$ of Fig. 4, showing the devices for holding and cutting the wire; and Fig. 6, a plan view of the twister.

As in this case, the invention relates mainly to the binding devices, and not to the harvester. I will only refer briefly to the latter.

In the drawings, A represents the main frame, and B the driving-wheel which imparts motion to the binding mechanism through the medium of the gear-wheels C, shown at the right hand of Fig. 1, and a lever, D, operated thereby, which lever is pivoted upon a standard, $d$, located on the front part of the main frame, as represented in Fig. 1.

In order to impart to the binder an intermittent motion, I use for the gear C the peculiar form of wheels patented to me November 8, 1870, to which patent reference is made for a description of said wheels, although my improved binder may be operated by other means instead, if desired.

In Figs. 1 and 2 I have shown the main frame and binding devices with the platform and cutting apparatus detached, it being understood that any suitable form of platform and cutting apparatus may be used, and that a reciprocating rake or gatherer is to be used, and so arranged as to gather the cut grain into bundles, and shove them from the platform in toward the main frame under the binder, as indicated in Fig. 1, there being an open space in the main frame between the binder and driving-wheel, through which the bundle falls after it is bound, as also represented in Fig. 1.

Having thus given a general description of the machine, I will now proceed to describe my improved binder.

Upon the main frame, at the inner side of the platform, I mount a vertical frame, $A^1$, to the upper cross-bar of which I secure a metallic plate, H, which serves as a guide for the reciprocating portion of the binder, and which I term the needle, in consequence of its resemblance in action to the needle of a sewing-machine, and which serves to convey an idea of its mode of operation. Upon a cross-bar, $A^2$, in line with and below the bar, to which the guide H is secured, I attach a plate, I, the upper surface of which is inclined toward the driving-wheel B, and which has a rectangular hole or opening made vertically through it, as shown in Figs. 1 and 2, for the needle E to enter as it descends. This plate I has a flange, $e'$, projecting downward on the side next to the platform, in which is a small hole, through which the binding-wire $i$ passes, as shown in Figs. 1 and 2, the wire also passing through an oiling cup or device, (not shown in the drawings;) and on its opposite side it has a similar flange, $o'$, which has in it a vertical slot, $j$, for the wire to enter, there being a spring, $r'$, located upon the inner side of this latter plate $o'$ in such a position that its free end shall lay at right angles to the slot, as shown in Fig. 2, and so that when the wire is carried down by the descent of the needle it will rest upon and depress the end of the spring, which latter will tend to raise the wire as the needle ascends, the main object of the spring being to hold the wire up, and cause it to enter the slot in the needle, and press it in between the clamping-jaws located within the needle, as here explained, it also serving to hold and adjust the wire to the exact position required in case there should be any slight variation in the point to which the needle shall descend, owing either to looseness in the joints of the operating mechanism or any springing or yielding of the parts. As shown in Fig. 2, both the guide-plate H and the needle-plate I are made adjustable by means of slots, laterally on the bars $A^1$ and $A^2$, so that the binder may be set further back or forward on the machine, according as the grain to be bound shall be longer or shorter. In this case a single wire is used for binding, and it is fed from a spool, $g$, secured to the rear of the frame, under the platform, the wire passing from the spool along the side of the bar $A^2$, to a point opposite the hole in the plate I, where it passes around a guide-roller, $h$, and extends thence through the hole, across the center of the opening through which the needle descends, and out through the slot $j$ on the opposite side, and from thence to the holding-jaws in the lower portion of the needle E, as shown in Fig. 1. The needle consists of a hollow rectangular oblong metallic bar, with its lower end pointed, and having a slit for the wire to enter extending from near its point up some distance, as shown in Figs. 1, 3, and 4, the two latter figures showing the details of the holding, twisting, and cutting devices, all of which are located within the needle, as there shown. The twister consists of a simple curved finger or hook, $u$, Figs. 3 and 6, attached to the lower end of a spiral rod, $t$, which is journaled in suitable bearings, so as to rotate freely. This is operated by a slide, $v$, which is connected to two sliding rods, $q$, working through guides $r$, as shown in Figs. 3 and 4, these rods being attached at their upper end to a plate, $o$, which projects laterally through an opening or slot in the upper portion of one of the sides or walls of the needle, these parts being so arranged that as the needle descends this cross-head or plate $o$ will come in contact with a shoulder or stop, $s$, Fig. 3, on bar $A^1$, and thus hold it from moving further vertically, and, as the needle continues its descent, it carries the spiral rod $t$ along with it, which causes the rod $t$, with its hook $u$, to rotate in its bearings. A similar stop, $f$, secured by a vertical arm, G, Fig. 1, is located directly over the upper end of the needle, at such a height that the cross-head $o$ will strike it as the needle ascends, so as to shove the guide $v$ down on the spiral rod $t$ to the position shown in Fig. 3, whereby the guide is ready to again rotate the twister $u$ at the ensuing descent of the needle.

It will be observed that the twister $u$ is arranged in relation to the slit in the needle, through which the wire passes diagonally, so as to be in the proper position to engage with or take hold of the wire when the twister is rotated, as above stated, during the descent of the needle.

The clamping or holding devices consist of a stationary jaw or block, $e$, secured to the inner wall of one side of the needle, alongside of the slit for the wire, and a corresponding pivoted jaw, $k$, at the opposite side of the slit, these jaws $e$ and $k$ both having their adjoining faces serrated, as shown in Figs. 4 and 5, for the purpose of more securely holding the wire. The jaw $k$ is curved on its face, as shown in Fig. 4, and has attached to its upper end a spring, $l$, which tends to keep it pressed against the stationary jaw $e$. This pivoted jaw $k$ is also provided with a cutting-lip, $a'$, Fig. 5, which, when the jaws are closed, projects past the edge of the stationary jaw $e$, as shown in Figs. 4 and 5. To operate this pivoted jaw and cutter, I provide a sliding bar or rod, $m$, which is connected to the slide $v$ that rotates the hook $u$, and which, therefore, moves with the slide and the parts that operate it, this rod $m$ having on its face two cams or projections, $n$ and $n'$, as shown in Fig. 4, these cams being arranged so that when the bar $m$ is shoved down the cam $n$ strikes against the lower point of the jaw $k$, and throws it back from jaw $e$, so as to permit the wire to enter between them, the loose end of the wire being already clamped between the jaws; and then, as the stop or shoulder $s$ arrests the further movement of the rods $q$, with their slide $v$, and the rod $m$, while the needle continues its descent, the cam $n'$ is brought in contact with the upper end of jaw $k$, which forces the cutting-edge of the latter over past the edge of jaw $e$, and thereby cuts off the wire, as shown in Fig. 5, the same movement of the needle, while the guide $v$ is held stationary, causing the twister to rotate and twist the wire, the twisting being thus almost entirely performed after the wire has been cut off. I construct the rod $m$ with a spring-shank, so that it will pass the jaw $k$ without operating it, except when the needle is at the point specified, and to insure its operating at that special time and no other, I provide another rod, $l'$, which has on its outer face a projection, $p$, this rod being pivoted loosely in rear of rod $m$, with its rear face projecting through a slot in the side of the needle, as shown in Fig. 4, so that when the needle arrives in its descent at the proper point, this projection $p$ will strike against the wall of the opening in the plate I, which will force the bar $l'$ inward, and thus furnish a rigid support for the bar $m$ to bear against. By this arrangement the bar $m$, with its cams $n$ and $n'$, are enabled to pass by the upper end of jaw $k$ without pressing against it, as soon as the needle has risen far enough to release the projection $p$ of bar $l'$ from contact with the wall of plate I, and thus leave jaw $k$ pressed by spring $l$ against the stationary jaw $e$ to hold the loose end of the wire, which would otherwise be released. The manner in which the loose end of the wire is retained by the jaws after the wire has been cut off is clearly shown in Fig. 5.

It will of course be understood that all the parts will be so arranged, and their movements so timed, as to impart to the several devices their respective movements at the required intervals.

The operation is as follows: The machine being put in motion, the grain is shoved across the platform under the spring-arms F, which keep it pressed down in a compact mass, the needle at such time being elevated, and holding the loose end of the wire, as shown in Fig. 1. As the bundle of grain is thus shoved under the arms F it comes against the wire, and by its pressure unwinds so much as is necessary to surround the bundle, or nearly so, when the needle descends, carrying the loose end with it down outside of and around the bundle, and as the point of the needle enters the opening in plate I, the wire which extends across the opening in plate I enters the slit in the needle, the latter descending astride of the wire until the latter is forced up between the jaws e and k alongside of the loose end, which was already there, the jaw k being thrown back by cam n for that purpose, as previously described. At this instant the cross-head o comes against its stop s, and as the needle continues its descent the spiral rod t is carried down through the nut or guide v, thereby causing the hook u to begin to rotate and twist the wire together, and the instant this is done the upper cam n' strikes against the upper end of the jaw k, thereby crowding the knife a' over and cutting off the wire and releasing the bundle, which drops down upon the ground, the needle being raised as soon as this is done, and carrying with it the loose end of the wire, which is thus held up, ready for the next bundle, when the operation is repeated.

Having thus described my invention, what I claim is—

1. The binding apparatus, consisting of the reciprocating needle E, having arranged within it the twister u, and the clamping and cutting jaws e and k, with the sliding nut v and the sliding cams n and n', all constructed and arranged to operate substantially as described.

2. The pivoted cutting-jaw k and stationary jaw e, in combination with the reciprocating bar m, provided with the cams n and n', and the pivoted bar l', arranged to operate as described, for the purpose of holding and cutting the wire at the proper times, as herein set forth.

3. The stops f and s, in combination with the reciprocating needle, having the sliding nut v and the bar m arranged therein to operate the twister u and the jaw k, as and for the purposes described.

4. In combination with the reciprocating needle E, provided with the wire holding cutting and twisting devices, the plate I, provided with the hole and slit j for the wire to enter, and the spring r', all arranged to operate substantially as described.

JOHN H. WHITNEY.

Witnesses:
J. C. SUMNER,
C. BREWER.